United States Patent
Zhao et al.

(10) Patent No.: US 9,886,764 B2
(45) Date of Patent: Feb. 6, 2018

(54) IMAGE ACQUISITION SYSTEM, IMAGE ACQUISITION METHOD, AND INSPECTION SYSTEM

(71) Applicant: KLA-TENCOR CORPORATION, Milpitas, CA (US)

(72) Inventors: Guoheng Zhao, Palo Alto, CA (US); Stanley E. Stokowski, Danville, CA (US); Andrew Hill, Berkeley, CA (US); Johan De Greeve, Brabant (BE); Maarten Van Der Burgt, Leuven (BE); Karel Van Gils, Blanden (BE)

(73) Assignee: KLA-Tencor Corporation, Milpitas, CA (US)

( * ) Notice: Subject to any disclaimer, the term of this patent is extended or adjusted under 35 U.S.C. 154(b) by 280 days.

(21) Appl. No.: 14/926,984

(22) Filed: Oct. 29, 2015

(65) Prior Publication Data
US 2016/0048969 A1 Feb. 18, 2016

Related U.S. Application Data

(63) Continuation of application No. PCT/US2015/030634, filed on May 13, 2015.
(Continued)

(51) Int. Cl.
*G06T 7/00* (2017.01)
*H04N 5/372* (2011.01)
(Continued)

(52) U.S. Cl.
CPC ........ *G06T 7/0073* (2013.01); *G01B 11/0608* (2013.01); *G01B 11/2513* (2013.01);
(Continued)

(58) Field of Classification Search
None
See application file for complete search history.

(56) References Cited

U.S. PATENT DOCUMENTS

| 5,646,733 | A * | 7/1997 | Bieman | G01B 11/2522 250/237 G |
| 7,315,383 | B1 * | 1/2008 | Abdollahi | G01B 11/0608 356/601 |

(Continued)

FOREIGN PATENT DOCUMENTS

| JP | 2002257527 A | 9/2002 |
| WO | 0171279 A1 | 9/2001 |
| WO | 2006039796 A1 | 4/2006 |

*Primary Examiner* — Andy Rao
*Assistant Examiner* — Tyler Edwards
(74) *Attorney, Agent, or Firm* — Simpson & Simpson, PLLC

(57) ABSTRACT

The invention relates to an image acquisition system and an image acquisition method, as well as to an inspection system having at least one such image acquisition system. A projector projects a pattern on a surface of a sample, a camera records light intensity information from within at least two detection fields defined by the camera on the surface of the sample. A relative motion between the sample on the one hand and the camera and projector on the other hand is generated. From the acquired at least one image a height profile of the surface of the sample may be inferred. The pattern may comprise a number of sub-patterns related to each other by a phase shift. Alternatively, the pattern may be a fringe pattern.

35 Claims, 4 Drawing Sheets

Related U.S. Application Data

(60) Provisional application No. 61/992,893, filed on May 14, 2014.

(51) Int. Cl.
 *G01B 11/06* (2006.01)
 *G01B 11/25* (2006.01)
 *G06T 7/586* (2017.01)

(52) U.S. Cl.
 CPC .......... *G01B 11/2522* (2013.01); *G06T 7/586* (2017.01); *H04N 5/37206* (2013.01); *G06T 2207/10052* (2013.01); *G06T 2207/20208* (2013.01)

(56) References Cited

U.S. PATENT DOCUMENTS

| | | | |
|---|---|---|---|
| 7,317,542 B2 * | 1/2008 | Krambeer | B21B 38/02 356/429 |
| 2008/0117438 A1 * | 5/2008 | Quirion | G01B 11/2509 356/610 |
| 2013/0098127 A1 | 4/2013 | Isei et al. | |

* cited by examiner

IMAGE ACQUISITION SYSTEM, IMAGE ACQUISITION METHOD, AND INSPECTION SYSTEM

CROSS REFERENCE TO RELATED APPLICATIONS

This application is filed under 35 U.S.C. §120 and §365(c) as a continuation of International Patent Application Serial No. PCT/US15/30634, filed on May 13, 2015, which application claims the benefit under 35 U.S.C. 119(e) of U.S. Provisional Patent Application No. 61/992,893 filed on May 14, 2014, which applications are incorporated herein by reference in their entirety.

FIELD OF THE INVENTION

The invention relates to image acquisition systems and image acquisition methods, designed for evaluating a height profile of a sample from projections of a pattern on a surface of the sample. The invention also relates to an inspection system for articles including at least one such image acquisition system.

BACKGROUND OF THE INVENTION

A method for obtaining a height profile (or 3D topography) of an object or sample, more precisely of a surface of the object or sample, is known as Moiré 3D phase shift image processing or phase profilometry. A pattern is projected on the surface of interest. Depending on the height profile of the surface, these lines as projected on the surface are deformed with respect to the shape they would have if projected onto a plane, i.e. onto a surface of constant height. From images of the deformed lines, the height profile of the surface can be inferred. To this end, usually more than one pattern is used. For larger surfaces, the projected pattern is projected repeatedly on different areas of the surface in a stepped fashion, in order to cover the entire surface of interest.

The published US patent application US 2008/0117438 A1 discloses a phase profilometry system determining the height of a given point with respect to a reference plane using the projection of at least two distinct patterns, which are projected one after the other. The arrangement of the projection and detection devices is such that the detection does not occur in the direction of specular reflection, and therefore the surface must exhibit a diffuse reflection component of sufficient strength to produce a suitably high contrast in the resulting images used for height evaluation. Purely specular surfaces cannot be analyzed with this setup. The published PCT application WO 2006/039796 A1 overcomes this latter deficiency by adding a second detection device in order to detect light from the surface along the direction of specular reflection.

The published PCT application WO 0171279 A1 addresses the problem that the projection of multiple patterns, one after the other, is time-consuming, which is a serious disadvantage if high through-put of the analysis is paramount. The proposed solution is to project multiple patterns onto the surface of the object simultaneously, however at different wavelengths. Applying corresponding filters, images of the multiple projected patterns, deformed according to the height profile of the surface, can be obtained at once.

Restriction to a possibly weak diffusive component of scattered light obviously is a disadvantage. Including a second detection device makes the resulting apparatus more complex, and brings about additional issues like calibration and relative alignment of the two detection devices. Using projections at multiple wavelengths also makes the setup more complicated and implies possible alignment or calibration issues. There may furthermore be problems if the surface to be measured reflects some of the wavelengths employed better than others. The stepping approach, if larger surfaces are to be scanned, may lead to alignment errors of the fields of view used at each step, and therefore produce inaccuracies in the final results of the measurements.

BRIEF SUMMARY OF THE INVENTION

It therefore is an object of the invention to provide an image acquisition system for acquiring at least one image of a surface of a sample, which is of simple configuration, and allows the quick and reliable generation of a height profile of the surface.

It is a further object of the invention to provide an image acquisition method for acquiring at least one image of a surface of a sample, which allows the quick and reliable generation of a height profile of the surface.

It is yet another object of the invention to provide an inspection system for inspection of at least one article, which is allows the quick and reliable generation of a height profile of a surface of the article, and which achieves this capability without complex configurations.

The above objects are achieved with regard to the image acquisition system by an image acquisition system according to claim 1, with regard to the method by an image acquisition method according to claim 20, and with regard to the inspection system by an inspection system according to claim 30.

In one embodiment of the invention, the image acquisition system for acquiring at least one image of a surface of a sample comprises a projector, a camera, and a means to generate a relative motion between the sample on the one hand, and the camera and projector on the other hand. The projector is configured to project a pattern onto an area of the surface of the sample; the area may include the entire surface considered or only a part thereof. For any given measurement of the height profile of the surface, the camera and the projector are in a fixed spatial arrangement with respect to each other, and the means to generate a relative motion is configured to move the sample relative to this arrangement of camera and projector. The means to generate a relative motion can be any suitable apparatus or device, for example conveyor belt, robotic handler, or a moveable stage for the sample or for the projector-camera arrangement. The means defines a reference plane, the relative motion is in or parallel to this reference plane, in particular a direction of the relative motion lies in the reference plane or in a plane parallel to it. The reference plane also is the plane of height zero, i.e. the plane with respect to which the height values of the height profile of the surface of the sample are determined. The height value of a given point of the surface of the sample is the distance of that point from the reference plane along a normal of the reference.

The camera is configured to define at least two detection fields within the area of the surface of the sample the projector projects the pattern on. The detection fields so defined are those areas on the surface from which the camera records light intensity information. The at least two detection fields can be defined by optical elements in an imaging path of the camera, or by electronic means on a detector of the camera, for example, only a defined subset of the set of photosensitive elements of the detector of the camera may be selected for processing, or any combination thereof. The selection of such a subset of photosensitive elements may be achieved by software, for example under user control. The detection fields defined by the camera are arranged such that if they are geometrically projected parallel to an imaging path or optical axis of the camera onto the reference plane, there is a line in the reference plane parallel to the direction of the relative motion which intersects the geometric projection of each of the at least two detection fields. This arrangement of the detection fields implies that there is a portion of the surface of the sample which, in the course of the relative motion, is consecutively covered by each of the at least two detection fields. From the light intensity information recorded from within the at least two detection fields over the course of the relative motion at least one image of the surface of the sample results. This at least one image can then be processed to obtain a height profile of the surface of the sample.

In a preferred embodiment, the geometric projections of the at least two detection fields onto the reference plane have an extension in a direction orthogonal to the direction of the relative motion which is larger than their extension in the direction of the relative motion. Particularly preferred is that the geometric projections of the at least two detection fields are parallel rectangles of equal size.

In one embodiment, the pattern comprises a plurality of sub-patterns, each sub-pattern to be projected on a separate portion of the surface of the sample. In particular, at least two of the sub-patterns may be related by a phase-shift. For example, each of the sub-patterns may be a fringe pattern, and by phase-shifting the fringe pattern of one of the sub-patterns, the fringe patterns of the further sub-patterns may be obtained.

With the sub-patterns given and the detection fields defined, in one embodiment the relative arrangement of the at least two detection fields and the projected sub-patterns is such that from each detection field light intensity information corresponding to only one of the sub-patterns is recorded. In particular, each detection field may be contained within one sub-pattern projected on the surface of the sample. Furthermore, in an embodiment, the number of sub-patterns is equal to the number of detection fields.

In an embodiment, the pattern is a fringe pattern. If geometrically projected onto the reference plane along a direction of projection of the projector, the projections of the fringes include an angle with the direction of the relative motion which is larger than 0 degrees and smaller than 90 degrees. The fringe pattern, if geometrically projected onto the reference plane along a direction of projection of the projector, may in particular be periodic, and the angle between the direction of relative motion and the orientation of the geometrically projected fringes is such that across the at least two detection fields a single fringe completes a full period of the fringe pattern.

The relative motion may in particular be a continuous motion.

In an embodiment, the camera is configured to record light intensity information from the at least two detection fields repeatedly over the course of the relative motion at fixed time intervals. In particular, the timing of the repeated recording of light intensity information may be such that light intensity information from a given area of the surface is consecutively recorded from at least two of the at least two detection fields.

In an embodiment, the camera is a TDI line scan camera. The camera may also, additionally or alternatively, be configured to perform high dynamic range image acquisition. For a TDI line scan camera, each detection field defined by the camera may correspond to one or plural lines of the camera.

In an embodiment, the projector and the camera are positioned and oriented such that an angle between the direction of incidence of light from the projector and a normal of the reference plane is equal to the angle between an optical axis of the camera and the normal of the reference plane.

In an embodiment, a filter is provided in the objective pupil of the camera, the filter configured to reduce the intensity of specular reflection from the sample entering the camera. The filter may in particular be one of a plurality of filters provided for the image acquisition system. In an exemplary configuration, the filter is provided on a filter wheel.

In an embodiment, the direction of an optical axis of the camera is different from the direction of specular reflection from the sample.

In an embodiment, the numerical aperture of the projector is smaller than the numerical aperture of the camera.

In the image acquisition method according to the invention for acquiring at least one image of a surface of a sample a pattern is projected onto the surface of the sample. This may be done by any suitable projection apparatus with associated optics. At least two detection fields are defined on the surface of the sample within the projected pattern and with a fixed position relative to the projected pattern. A relative motion is generated between the projected pattern and the sample in a pre-defined reference plane. The reference plane serves as reference of zero height with respect to which the height profile of the surface of the sample is defined. Light intensity from within the at least two detection fields is recorded repeatedly over the course of the relative motion. This may be done by any suitable recording equipment, for instance a camera, including corresponding optics. The at least two detection fields are arranged in such a way that there is a line in the reference plane parallel to a direction of the relative motion, which line intersects a geometric projection of each of the at least two detection fields into the reference plane. The geometric projection may in particular be along an optical axis of the recording equipment used. The arrangement of the at least two detection fields may alternatively be characterized as the at least two detection fields being arranged such that there is an area of the surface of the sample which is consecutively covered by each of the at least two detection fields over the course of the relative motion.

The relative motion may in particular be continuous.

In embodiments the recording of light intensity from within the at least two detection fields is performed repeatedly over the course of the relative motion in such a way that light intensity from a given portion of the surface of the sample is consecutively recorded from within each of the at least two detection fields over the course of the relative motion.

In embodiments the pattern projected onto the surface of the sample comprises a plurality of sub-patterns. Each sub-pattern is projected on a separate portion of the surface of the sample. In particular, at least two of the sub-patterns may be related by a phase-shift. In embodiments the relative arrangement of the at least two detection fields and the projected sub-patterns is such that from each detection field light intensity information corresponding to only one of the sub-patterns is recorded. In particular, the number of sub-patterns may be equal to the number of detection fields.

In an alternative embodiment of the method, the pattern is a fringe pattern. In particular, the direction of relative motion and an orientation of fringes of the fringe pattern, if geometrically projected onto the reference plane along a direction of projection of the pattern, include an angle between them which is larger than 0 degrees and smaller than 90 degrees. In particular, the fringe pattern, if geometrically projected onto the reference plane, may be periodic, and the angle between the direction of relative motion and the orientation of the fringes may be such that across the at least two detection fields a single fringe completes a full period of the fringe patient.

Embodiments of the image acquisition method according to the invention may in particular be carried out using embodiments of the image acquisition system according to the invention.

An inspection system according to the invention for inspection of at least one article includes at least one image acquisition system as described above. The article, in this case, corresponds to the sample in the above description. The inspection system is configured to analyze at least one image of the surface of the article acquired with the at least one image acquisition system, in order to obtain a height profile of the surface of the article. The inspection system can include at least one computer system to perform this analysis. In an embodiment, the inspection system exhibits at least one conveyor configured to move the article past the projector and camera of the image acquisition system. The surface of the conveyor supporting the article provides an exemplary definition of a reference plane, i.e. the height profile of the article in this case is measured relative to the surface of the conveyor. The inspection system may include more than one inspection station, the inspection stations performing different types of inspection, and may also include handling devices for the articles, for example robots, which can be used to reorient, for example, flip over, the article, so that both a surface of the article on a front side of the article and a surface of the article on a back side of the article can be inspected.

In a specific embodiment of the image acquisition system for acquiring at least one image of a surface of a sample, the image acquisition system comprises a camera, a projector, and a means to generate a relative motion between the sample on the one hand and the camera and projector on the other hand. The means to generate the relative motion defines a reference plane, in which the relative motion occurs. The projector is configured to project a pattern composed of a number P of sub-patterns onto an area of the surface of the sample. The number P is greater than one and the sub-patterns are fringe patterns related to each other by phase shifts. The camera is configured to define a number D of detection fields, the number D equal to the number P of projected sub-patterns, within the area of the surface of the sample the projector projects the pattern on. Geometric projections of the detection fields onto the reference plane along an optical axis of the camera are arranged in such a way that there is a line in the reference plane parallel to a direction of the relative motion which intersects the geometric projection of each detection field. Each detection field is aligned with one projected sub-pattern, and the camera is configured to record light intensity from each detection field.

In a further specific embodiment of the image acquisition system for acquiring at least one image of a surface of a sample, the image acquisition system comprises a camera, a projector, and a means to generate a relative motion between the sample on the one hand and the camera and projector on the other hand, the means defining a reference plane. The projector is configured to project a fringe pattern onto an area of the surface of the sample, geometric projections of the fringes into the reference plane along a direction of projection of the projector including an angle greater than 0 degrees and smaller than 90 degrees with a direction of the relative motion. The camera is configured to define a number D of detection fields within the area of the surface of the sample the projector projects the pattern on. Geometric projections of the detection fields onto the reference plane along an optical axis of the camera are arranged in such a way that there is a line in the reference plane parallel to a direction of the relative motion which intersects the geometric projection of each of the detection fields. The angle between the direction of relative motion and the orientation of the fringes is such that across the D detection fields a single fringe completes a full period of the fringe pattern.

In a specific embodiment of the image acquisition method for acquiring at least one image of a surface of a sample a pattern, composed of a number P greater than one of sub-patterns, is projected onto an area of the surface of the sample. The sub-patterns are fringe patterns related to each other by phase shifts. In a pre-defined reference plane a relative motion between the projected pattern and the sample is generated. A number D of detection fields, the number D equal to the number P of projected sub-patterns, are defined within the area of the surface of the sample the projector projects the pattern on. Geometric projections of the detection fields onto the pre-defined reference plane are arranged in such a way that there is a line in the reference plane parallel to a direction of the relative motion which intersects the geometric projection of each of the D detection fields, wherein each detection field is aligned with a projected sub-pattern. Light intensity from within the D detection fields is recorded repeatedly over the course of the relative motion in such a way that light intensity from a given portion of the surface of the sample is consecutively recorded from each of the detection fields over the course of the relative motion.

In another specific embodiment of the image acquisition method for acquiring at least one image of a surface of a sample, a periodic fringe pattern is projected onto an area of the surface of the sample. In a pre-defined reference plane, a relative motion between the projected pattern and the sample is generated. A number D of detection fields are defined within the area of the surface of the sample the projector projects the pattern on. Geometric projections of the detection fields onto the reference plane are arranged in such a way that there is a line in the reference plane parallel to a direction of the relative motion which intersects the geometric projection of each of the D detection fields. An angle between the direction of relative motion and an orientation of the fringes of the fringe pattern, as geometrically projected onto the reference plane, is larger than 0 degrees and smaller than 90 degrees, and is such that across the D detection fields a single fringe completes a fill period.

BRIEF DESCRIPTION OF THE DRAWINGS

The nature and mode of operation of the present invention will now be more fully described in the following detailed description of the invention taken with the accompanying schematic drawing figures.

DETAILED DESCRIPTION OF THE INVENTION

Figure 1:
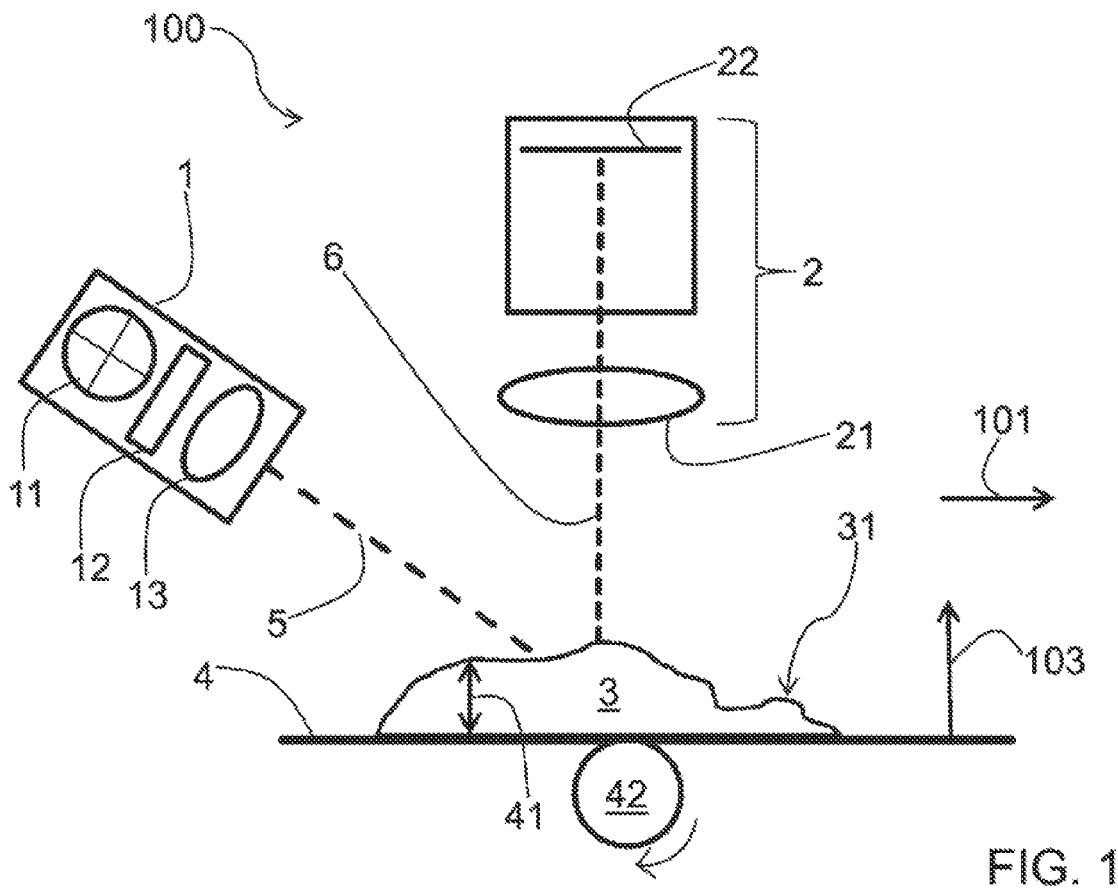
FIG. 1 is a schematic representation of an embodiment of an image acquisition system according to the invention.

Same reference numerals refer to same elements throughout the various figures. Furthermore, only reference numerals necessary for the description of the respective figure are shown in the figures. The shown embodiments represent only examples of how the invention can be carried out. This should not be regarded as limiting the invention.

FIG. 1 shows a sample 3 in an image acquisition system 100 according to the invention. The sample 3 is positioned on a reference plane 4. A projector 1 projects a pattern onto a surface 31 of the sample 3. The projector 1 is shown only schematically, but generally will include a light source 11, a light shaping element 12, which structures the light from the light source 11 in such a way that the desired pattern results, and projection optics 13. The light shaping element 12 can for example be a mask or a diffraction grating. Light intensity information from within at least two detection fields 8 (see FIG. 2) is recorded by a camera 2. The camera 2 defines the detection fields 8. The camera 2 includes a light-sensitive detector 22 and is taken to include any imaging optics 21 used to form an image of the surface 31 of sample 3 on the detector 22. By means 42 a relative motion between the sample 3 on the one hand and the detector 1 and camera 2 on the other hand is generated along a direction 101. That is, the camera 2 and the detector 1 are fixed with respect to each other, and the sample 3 is moved relative to them. For example, the reference plane 4 could be a top surface of a movable stage or a conveyor, and the means 42 configured to drive the stage or conveyor, respectively. From the light intensity information recorded by the camera 2, the height profile of the surface 31 of sample 3 can be inferred. That is, for any point of the surface 31, its height 41 relative to the reference plane 4, i.e. the distance of the respective point from the reference plane 4 in a direction 103 normal to the reference plane 4, can be inferred. The direction 101 of relative motion is perpendicular to the direction 103 normal to the reference plane 4, i.e. the relative motion is parallel to the reference plane 4. Associated with the projector 1 is a direction 5 of projection, associated with the camera 2 is an optical axis 6, indicating the direction of an imaging path along which light from the surface 31 of the sample 3 travels to the camera 2. The direction 5 of projection and the optical axis 6 of the camera 2 are shown as straight lines here. However, in different embodiments and less schematic representations, the path of the light from the light source 11 to the surface 31, and from the surface 31 to the detector 22 of camera 2 may be folded. The direction 5 of projection and the direction of the optical axis 6 are always to be understood as the directions of the corresponding lines in the vicinity of the reference plane 4, i.e. the last direction of the direction 5 of projection before incidence of the light on the surface 31, and the first direction along which light leaves the surface 31 along the optical axis 6. In the embodiment shown in FIG. 1, the direction 101 of relative motion is in the plane defined by the direction 5 of projection and the optical axis 6. This is not a limitation of the invention; in fact, it will be seen below that different arrangements are also possible.

Figure 2:
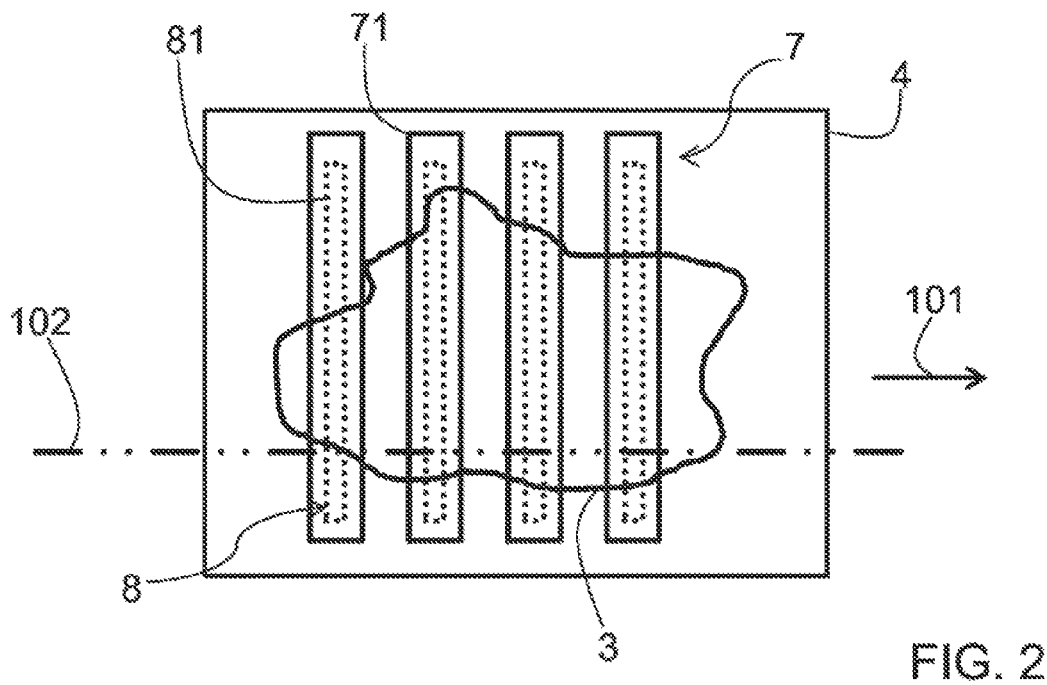
FIG. 2 is a top view of a sample, placed in the image acquisition system of FIG. 1.

FIG. 2 shows a top view of a sample 3 placed in the image acquisition system 100 of FIG. 1. The pattern 7 projected by projector 1 onto the surface 31 of the sample 3 is shown by, in the present embodiment, four, rectangular areas 71 the sub-patterns the pattern 7 consists of would occupy on the reference plane 4. For those portions of the reference plane 4 that are covered by the sample 3 these areas are those that would result if the pattern 7 as projected onto the surface 31 were geometrically (instead of optically, as usually light does not pass through the sample) projected onto the reference plane 4 along the direction 5 of projection associated with projector 1. Note that, as will be seen in more detail below, the projected light intensity within a sub-pattern area 71 need not be homogeneous.

Indicated by dashed rectangles 81 are the areas the detection fields 8, as defined by the camera 2, would occupy if the sample 3 were not present. The rectangles 81 therefore correspond to the geometric projection of the detection fields onto the reference plane 4 along the direction of the optical axis 6 of the camera 2. For those parts of the reference plane 4 that are occupied by the sample 3, the detection fields 8 extend across the surface 31 of the sample 3, and therefore portions of the same or different detection fields 8 may be located at different heights from the reference plane 4. The camera 2 is configured to record light intensity from within these detection fields 8.

Also shown is a line 102 in the reference plane 4. This line 102 is parallel to the direction 101 of the relative motion. The geometric projections 81 of the detection fields 8 are arranged in such a way that the line 102 intersects each geometric projection 81 of a detection field 8.

Figure 3:
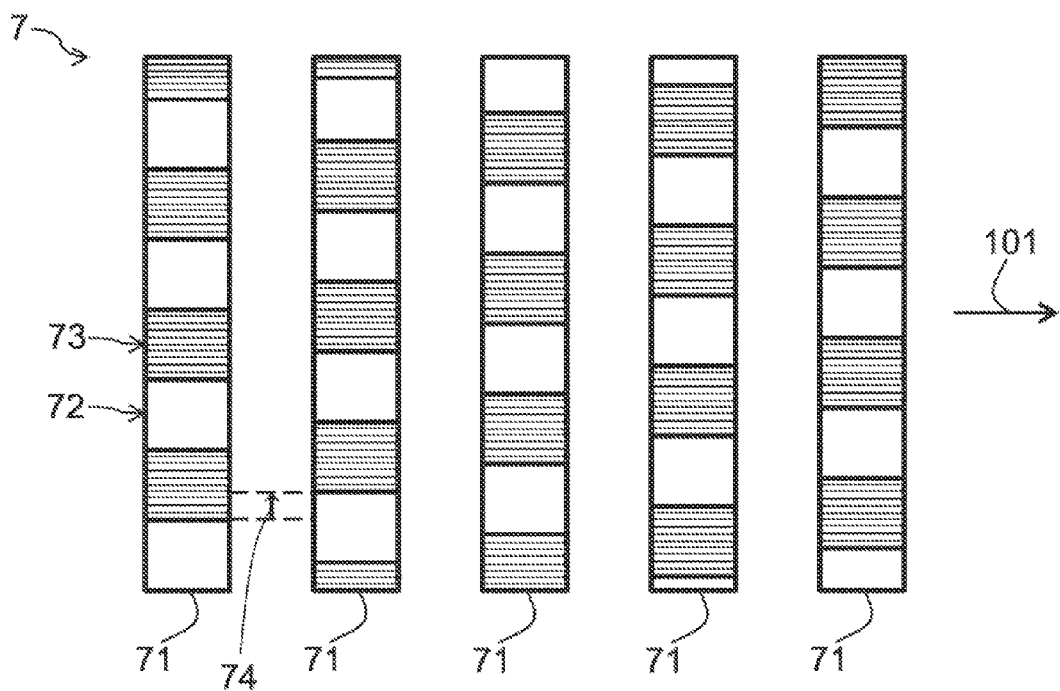
FIG. 3 is a representation of a pattern comprising a plurality of sub-patterns.

FIG. 3 shows a pattern 7 comprising a plurality, here five, of sub-patterns 71. Shown are the sub-patterns 71 that would result if the pattern 7 were projected into the reference plane (not shown). If projected onto the surface 31 of the sample 3, the sub-patterns 71 and thus the pattern 7 would be deformed. These deformations carry the information on the height-profile of the surface 31 that is to be obtained. Each sub-pattern 71 here consists of a periodic sequence of bright areas 72 and dark areas 73. In the embodiment shown, each sub-pattern 71 may be considered a fringe pattern. In the embodiment shown, the sub-patterns 71 are related to each other by a phase shift 74; here the phase shift 74 between consecutive sub-patterns 71 is constant. Indicated furthermore is the direction 101 of relative motion. Note that the sub-patterns 71 complete one period of their periodicity over the five sub-patterns 71 shown. Detection fields 8 are not shown here for the sake of clarity, but may for example coincide with the rectangles 71 or be positioned and aligned relative to the rectangles 71 as indicated in FIG. 2.

Figure 4:
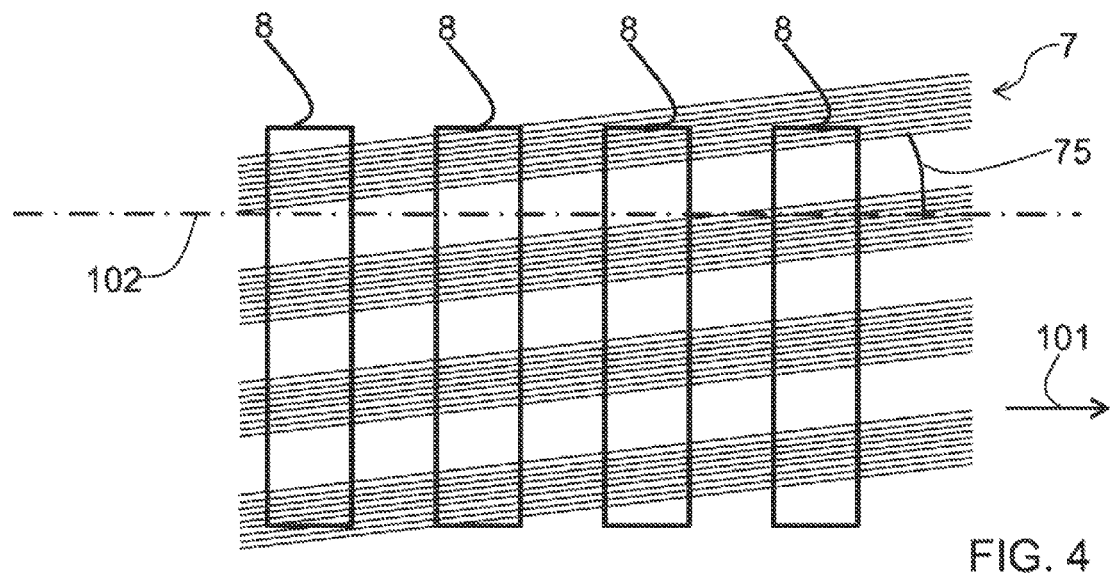
FIG. 4 is a representation of a fringe pattern and detection fields.

FIG. 4 shows a periodic fringe pattern 7, and detection fields 8, both as would result from projection into the reference plane (not shown). An angle 75 between a line 102 parallel to the direction 101 of relative motion and an orientation of the fringes of the pattern is greater than 0 degrees and less than 90 degrees. In a preferred embodiment the angle 75 is chosen such that if one proceeds from detection area 8 to detection area 8 along the direction of relative motion, the fringe pattern completes one period of its periodicity from the first to the last detection area 8.

Figure 5:
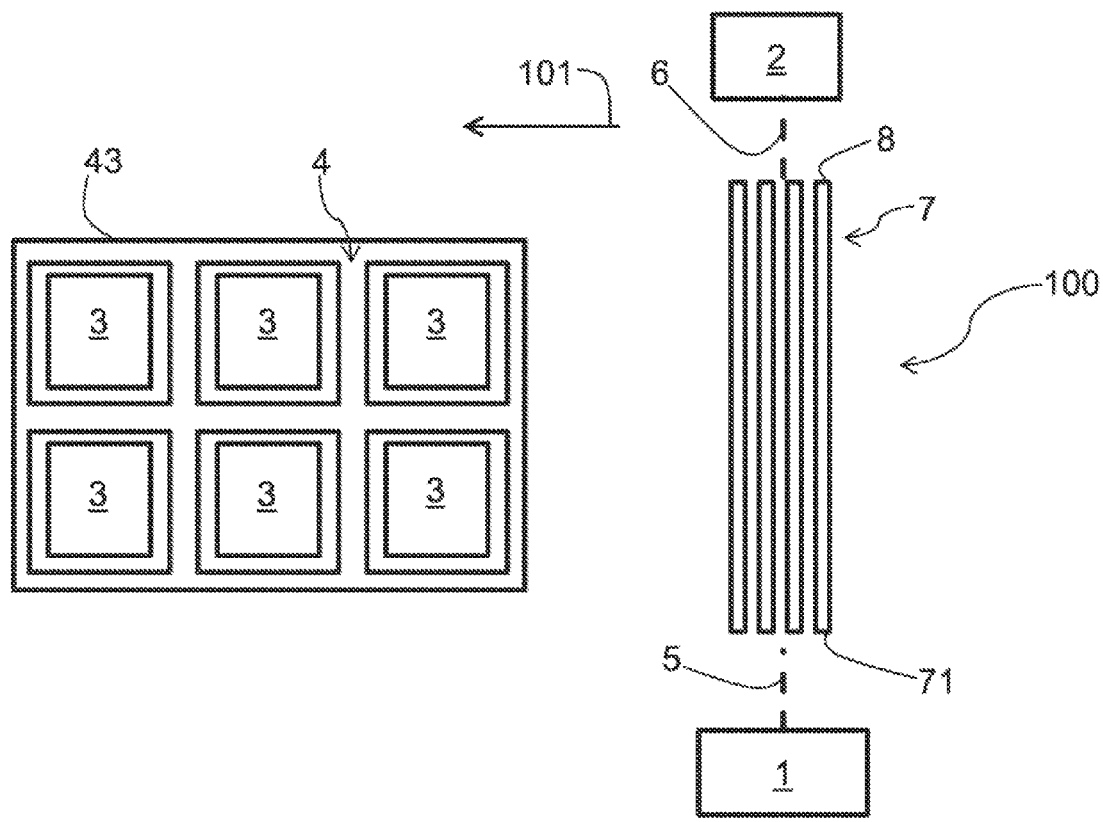
FIG. 5 is an illustration of a principle setting for image acquisition according to the invention.

FIG. 5 shows a principle setting for image acquisition according to the invention, using an image acquisition system 100 according to the invention. Shown is a projector 1 projecting a pattern 7 comprising four sub-patterns 71. The sub-patterns are only indicated as rectangles, but may for example be structured as shown in FIG. 3. In the embodiment shown, four detection fields 8 coincide with the projected sub-patterns 71, each detection field 8 corresponding to one of the sub-patterns 71. Also shown are a number of samples 3 placed on a tray 43, which here is taken to define also the reference plane 4. As shown, the pattern 7 is not yet projected on the samples 3, but drawn as it would appear projected on the reference plane 4. Over the course of the relative motion in the direction 101, the pattern is projected on the samples 3, and the camera 2 can record light intensity information from the surface of the samples 3. In the embodiment shown here, the direction 101 of relative motion, contrary to the case shown in FIG. 1, is perpendicular to the plane defined by the direction of projection 5 of projector 1 and the optical axis 6 of the camera 2.

Figure 6:
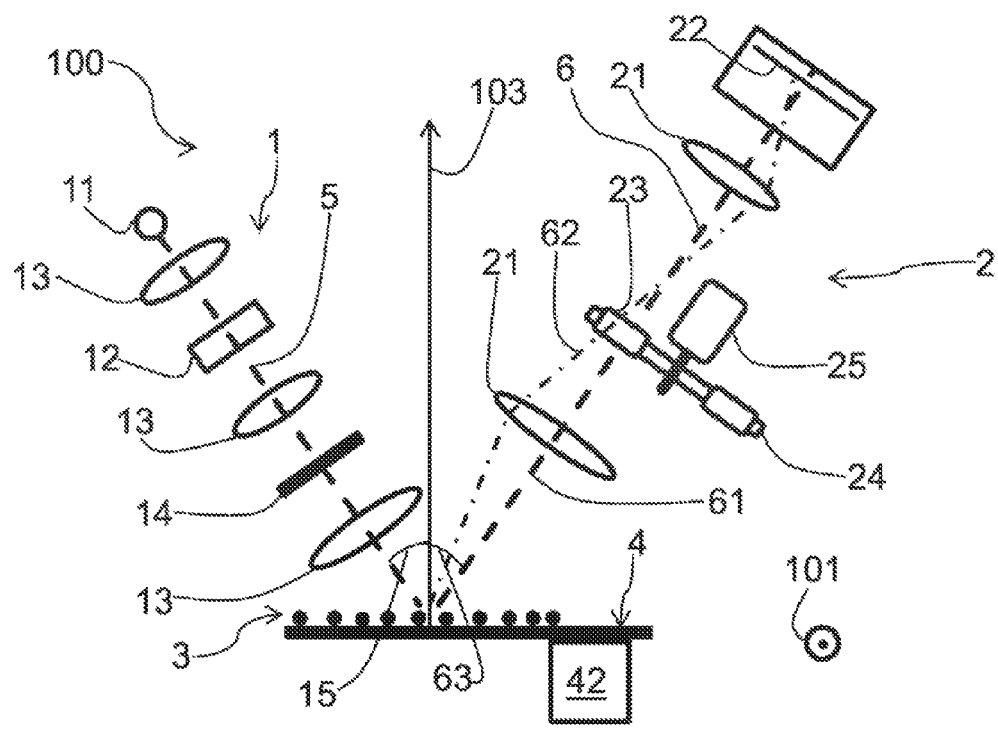
FIG. 6 is a schematic representation of an embodiment of an image acquisition system according to the invention, including a pupil filter.

FIG. 6 shows an embodiment of an image acquisition system 100 according to the invention. The system comprises a projector 1, a camera 2, and a means 42 for generating a relative motion between a sample 3 on the one hand and the projector 1 and camera 2 on the other hand in a direction 101. The direction 101 of relative motion here is pointing out of the plane of the drawing, and is perpendicular to the plane defined by a direction 5 of projection of the projector 1 and an optical axis 6 of the camera 2, as in FIG. 5, and in contrast to FIG. 1. The sample 3 here is a collection of dots, for instance, solder dots, disposed on a plane which in the example shown forms the reference plane 4.

The projector 1 comprises a light source 11, a light shaping element, which here is a linear grating 12, projection optics 13, and an illumination aperture 14, which here is smaller than an aperture of the camera 2. The camera 2 comprises imaging optics 21, a light-sensitive detector 22, and here also comprises a plurality of pupil filters 23, mounted on a filter wheel 24. The pupil filters 23 of the plurality of pupil filters differ between them with respect to their transmission profiles. All pupil filters 23 have a lower transmission in a center of the pupil filter than in outer areas of the pupil filter. The arrangement of the pupil filters 23 on filter wheel 24 allows to easily switch between pupil filters 23, such a switch being accomplished by a filter wheel drive 25 rotating the filter wheel 24.

In the embodiment shown, an angle 15 between the direction of projection 5 and a normal 103 of the reference plane 4 is equal to an angle 63 between a light ray 61 reflected from the sample 3 by specular reflection and the normal 103 of the reference plane 4. The direction of the light ray 61 reflected by specular reflection here coincides with the optical axis 6 of the camera 2. Furthermore, a light ray 62 is shown which is reflected from the sample 3 by diffuse reflection. The pupil filter 23 is positioned in such a way with respect to the light rays 61 and 62 that the light ray 61 resulting from specular reflection passes through a central area 27 (see FIG. 7) of the pupil filter 61, whereas the light ray 62 resulting from diffuse reflection passes through an outer area. 26 (see FIG. 7) of the pupil filter 23. Due to the above described constitution of the pupil filters, a percentage of the light intensity of light ray 62 from diffuse reflection reaching the detector 22 will be higher than a percentage of the light intensity of light ray 61 from specular reflection reaching the detector 22. This in particular leads to better contrast of the image of the sample recorded by the camera with light from diffuse reflection. The embodiment shown in FIG. 6 can therefore be used for image acquisition from a variety of samples, where the diffuse and specular reflectivities of the samples within the variety of samples extend over a broad range.

In different embodiments only a single pupil filter 23 may be used. If a plurality of pupil filters are used, they may be mounted in other ways for easy switching than on a filter wheel 24. For example, plural pupil filters may be mounted on a frame, arranged linearly one next to the other, and the switching between pupil filters would be accomplished by a linear motion of the frame.

Figure 7:
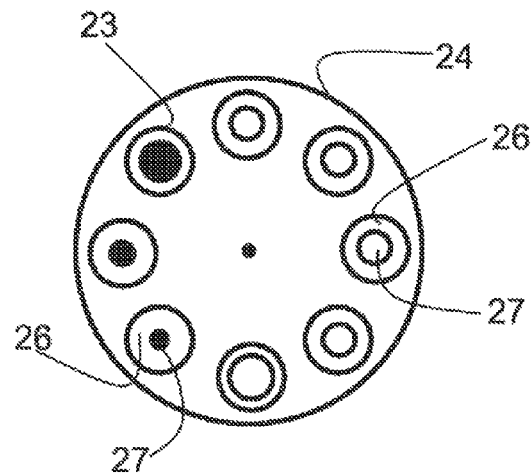
FIG. 7 is an illustration of an exemplary pupil filter wheel.

FIG. 7 illustrates an exemplary pupil filter wheel 24, as used in the image acquisition system 100 of FIG. 6. The pupil filter wheel 24 carries a number, here eight, of pupil filters 23. Each pupil filter 23 has an outer area 26 and a central area 27. The transmission of light through the central area 27 is lower than the transmission of light through the outer area 26. For some pupil filters 23, the central area 27 may be completely opaque. Otherwise, the transmission may vary across a respective pupil filter 23 in any desired fashion, always, however, having a minimum at the center of the respective pupil filter 23.

Figure 8:
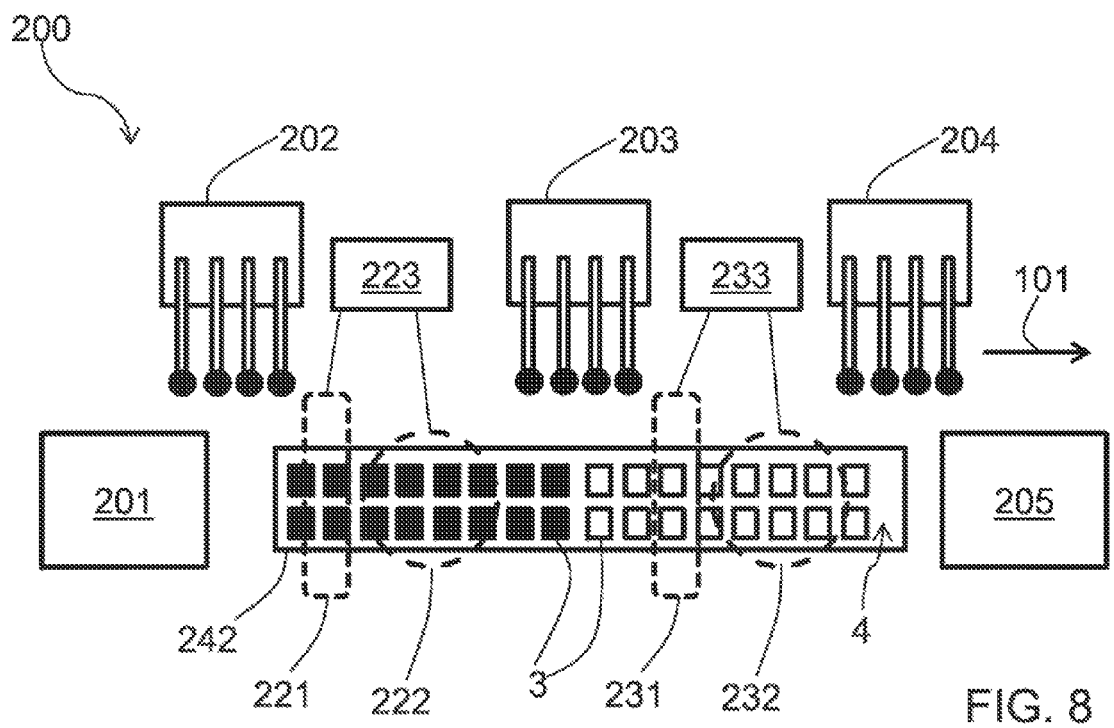
FIG. 8 is a representation of an embodiment of an inspection system for articles using at least one image acquisition system according to the invention.

FIG. 8 shows an embodiment of an inspection system according to the invention. The inspection system 200 is configured to inspect articles 3. The articles 3 are delivered to the inspection system 200 on an input tray 201. By pick-and-place-device 202, the articles are placed on precision conveyor 242. The conveyor 242 carries the articles 3 in a direction 101 at constant speed. The articles 3 are carried past several inspection zones 221, 222, 231, 232 by the conveyor 242. In inspection zone 221 an image acquisition system according to the invention, as described above, acquires at least one image of a top side (indicated by black filled rectangles) of the articles 3, from which a height profile of the articles relative to a reference plane 4 is obtained. The reference plane 4 here is given by the surface of the conveyor 242 supporting the articles 3. The generation of the height profile in inspection zone 221 may be followed by further inspection steps performed on the top side of the articles 3 in inspection zone 222. The articles 3 are then turned over on the conveyor 242 by pick-and-flip device 203, so that now a bottom side (indicated by unfilled rectangles) of the articles 3 is facing up, the top side of the articles 3 now in contact with the surface of the conveyor 242. In inspection zone 231 an image acquisition system according to the invention, as described above, acquires at least one image of the bottom side of the articles 3, from which a height profile of the articles 3 relative to a reference plane 4 is obtained. The reference plane 4 here again is given by the surface of the conveyor 242 supporting the articles 3. The generation of the height profile in inspection zone 231 may be followed by further inspection steps performed on the bottom side of the articles 3 in inspection zone 232. The articles then are placed onto an output tray 205 by pick-and-place device 204.

The inspection steps performed on the top sides of the articles 3 in inspection zones 221 and 222 in this embodiment are controlled by computer system 223. The computer system 223 in particular is also configured to derive the height profiles of the top sides of the articles 3 from the at least one image of the articles 3 obtained according to the invention in inspection zone 221. The inspection steps performed on the bottom sides of the articles 3 in inspection zones 231 and 232 in this embodiment are controlled by computer system 233. The computer system 233 in particular is also configured to derive the height profiles of the bottom sides of the articles 3 from the at least one image of the articles 3 obtained according to the invention in inspection zone 231. In different embodiments, a different number of computer systems can be used, for example one computer system for each of the inspection zones 221, 222, 231, 232, or a common computer system for all the inspection zones. In any case, computer systems used for performing the inspection may also perform further tasks related with the inspection system, like controlling the pick-and-place devices 202 and 204, the pick-and-flip device 203, and the conveyor 242.

It will be appreciated that in FIG. 8 the precision conveyor 242 corresponds to the means 42 for generating a relative motion, the articles 3 correspond to the samples 3 described above.

The invention has been described with reference to specific embodiments. It is obvious to a person skilled in the art, however, that alterations and modifications can be made without leaving the scope of the subsequent claims.

LIST OF REFERENCE NUMERALS 1 projector
11 light source
12 light shaping element
13 projection optics
14 illumination aperture
15 angle
2 camera
21 imaging optics
22 detector
23 pupil filter
24 filter wheel
25 filter wheel drive
26 outer area
27 central area
3 sample
31 surface of sample
4 reference plane
41 height
42 means for generating relative motion
43 tray
5 direction of projection
6 optical axis of camera
61 light ray (specular reflection)
62 light ray (diffuse reflection)
63 angle
7 pattern
71 sub-pattern
72 bright area
73 dark area
74 phase shift
75 angle
8 detection field
81 rectangle
100 image acquisition system
101 direction of relative motion
102 line
103 normal of reference plane
200 inspection system
201 input tray
202 pick-and-place device
203 pick-and-flip device
204 pick-and-place device
205 output tray
221 inspection zone
222 inspection zone
223 computer system
231 inspection zone
232 inspection zone
233 computer system
242 conveyor

What is claimed is:

1. An image acquisition system for acquiring at least one image of a surface of a sample, comprising:
    a projector, configured to project a pattern onto an area of the surface of the sample;
    a camera configured to define at least two detection fields within an area of the surface of the sample onto which the projector projects the pattern, and to record light intensity information from each of the at least two detection fields; and,
    a means to generate a relative motion between the sample and the camera and projector, wherein the means defines a reference plane
    and a geometric projection of each of the at least two detection fields onto the reference plane along an optical axis of the camera are arranged in such a way that there is a line in the reference plane parallel to a direction of the relative motion which intersects the geometric projection of each of the at least two detection fields.

2. The system of claim 1, wherein the geometric projections of the at least two detection fields onto the reference plane have an extension in a direction orthogonal to a direction of the relative motion which is larger than an extension in the direction of the relative motion.

3. The system of claim 2, wherein the geometric projections of the at least two detection fields comprise parallel rectangles of equal size.

4. The system of claim 1, wherein the pattern comprises a plurality of sub-patterns, and each sub-pattern is projected on a separate portion of the surface of the sample.

5. The system of claim 4, wherein at least two of the sub-patterns are related by a phase-shift.

6. The system of claim 4, wherein a relative arrangement of the at least two detection fields and the projected sub-patterns is such that from each detection field light intensity information corresponding to only one of the sub-patterns is recorded.

7. The system of claim 6, wherein the plurality of sub-patterns has a first quantity, and the at least two detection fields have a second quantity, such that the first quantity is equal to the second quantity.

8. The system of claim 1, wherein the pattern comprises a fringe pattern.

9. The system of claim 8, wherein the direction of relative motion and an orientation of fringes of the fringe pattern include an angle between them which is larger than 0 degrees and smaller than 90 degrees, when geometrically projected onto the reference plane along a direction of projection of the projector.

10. The system of claim 9, wherein the fringe pattern, when geometrically projected onto the reference plane along a direction of projection of the projector, is periodic, and the angle between the direction of relative motion and the orientation of the fringes is such that across the at least two detection fields a single fringe completes a full period.

11. The system of claim 1, wherein the relative motion is continuous.

12. The system of claim 1, wherein the camera is configured to record light intensity information from the at least two detection fields repeatedly over a course of the relative motion at fixed time intervals.

13. The system of claim 1, wherein the camera comprises a TDI line scan camera.

14. The system of claim 1, wherein the camera is configured to perform high dynamic range image acquisition.

15. The system of claim 1, wherein an angle formed between a direction of incidence of light from the projector and a normal of the reference plane is equal to an angle formed between an optical axis of the camera and the normal of the reference plane.

16. The system of claim 1, wherein a filter is provided in an objective pupil of the camera, and the filter configured to reduce an intensity of a specular reflection from the sample entering the camera.

17. The system of claim 16, wherein the filter comprises one of a plurality of filters provided on a filter wheel.

18. The system of claim 1, wherein a direction of the optical axis of the camera is different from a direction of a specular reflection from the sample.

19. The system of claim 1, wherein a numerical aperture of the projector is smaller than a numerical aperture of the camera.

20. An image acquisition method for acquiring at least one image of a surface of a sample, comprising the steps:
projecting a pattern onto the surface of the sample;
defining at least two detection fields on the surface of the sample within the pattern having a fixed position relative to the pattern;
generating a relative motion between the pattern and the sample in a pre-defined reference plane; and,
recording light intensity from within the at least two detection fields repeatedly over a course of the relative motion, wherein the at least two detection fields are arranged in such a way that there is a line in the reference plane parallel to a direction of the relative motion, which line intersects a geometric projection of each of the at least two detection fields into the reference plane.

21. The method of claim 20, wherein the recording of the light intensity from within the at least two detection fields repeatedly over the course of the relative motion is performed in such a way that a light intensity from a given portion of the surface of the sample is consecutively recorded from within each of the at least two detection fields over the course of the relative motion.

22. The method of claim 20, wherein the pattern comprises a plurality of sub-patterns, an each sub-pattern is projected on a separate portion of the surface of the sample.

23. The method of claim 22, wherein at least two of the sub-patterns are related by a phase-shift.

24. The method of claim 22, wherein a relative arrangement of the at least two detection fields and the plurality of sub-patterns is such that from each detection field light intensity information corresponding to only one of the sub-patterns is recorded.

25. The method of claim 24, wherein the plurality of sub-patterns has a first quantity, and the at least two detection fields have a second quantity, such that the first quantity is equal to the second quantity.

26. The method of claim 20, wherein the pattern comprises a fringe pattern.

27. The method of claim 26, wherein the direction of relative motion and an orientation of fringes of the fringe pattern include an angle between them which is larger than 0 degrees and smaller than 90 degrees, when geometrically projected onto the reference plane along a direction of projection of the projector.

28. The method of claim 27, wherein the fringe pattern, when geometrically projected onto the reference plane along a direction of projection of the projector, is periodic, and the angle between the direction of relative motion and the orientation of the fringes is such that across the at least two detection fields a single fringe completes a full period.

29. The method of claim 20, wherein the relative motion is continuous.

30. An inspection system for inspection of at least one article, the inspection system comprising at least one image acquisition system according to claim 1, wherein the inspection system is configured to analyze at least one image of the surface of the at least one article acquired with the at least one image acquisition system.

31. The inspection system of claim 30, wherein the inspection system comprises at least one conveyor configured to move the at least one article past the projector and the camera of the image acquisition system.

32. An image acquisition system for acquiring at least one image of a surface of a sample, the image acquisition system comprising:
a camera;
a projector configured to project a pattern comprising a first plurality of sub-patterns onto an area of the surface of the sample, the sub-patterns comprising fringe patterns related to each other by phase shifts; and,
a means to generate a relative motion between the sample and the camera and projector, wherein the means defines a reference plane, and the camera is configured to define a second plurality of detection fields, such that a quantity of the first plurality is equal to a quantity of the second plurality, within the area of the surface of the sample the projector projects the pattern on, and geometric projections of the detection fields onto the reference plane along an optical axis of the camera are arranged in such a way that there is a line in the reference plane parallel to a direction of the relative motion which intersects the geometric projection of each of the second plurality of detection fields, and each detection field is aligned with one of the first plurality of sub-patterns, and the camera records a light intensity from each detection field.

33. An image acquisition system for acquiring at least one image of a surface of a sample, the image acquisition system comprising:
a camera;
a projector; and,
a means to generate a relative motion between the sample and the camera and projector, wherein the means defines a reference plane, and the projector is configured to project a fringe pattern onto an area of the surface of the sample, with geometric projections of fringes in the fringe pattern into the reference plane along a direction of projection of the projector including an angle greater than 0 degrees and smaller than 90 degrees with a direction of the relative motion and the camera is configured to define at least one detection fields within the area of the surface of the sample the projector projects the pattern on, and geometric projections of the detection fields onto the reference plane along an optical axis of the camera are arranged in such a way that there is a line in the reference plane parallel to a direction of the relative motion which intersects the geometric projection of each of the detection fields, and the angle between the direction of relative motion and the orientation of the fringes is such that across the at least one detection fields a single fringe completes a full period of the fringe pattern.

34. An image acquisition method for acquiring at least one image of a surface of a sample, comprising the steps:
projecting a pattern comprising a first plurality of sub-patterns onto an area of the surface of the sample, the sub-patterns comprising fringe patterns related to each other by phase shifts;
generating a relative motion between the pattern and the sample in a pre-defined reference plane;
defining a second plurality of detection fields within the area of the surface of the sample the pattern is projected on, such that a quantity of the first plurality is equal to a quantity of the second plurality, and geometric projections of the detection fields onto the pre-defined reference plane are arranged in such a way that there is a line in the reference plane parallel to a direction of the relative motion which intersects the geometric projection of each of the second plurality of detection fields, and each detection field is aligned with one of the first plurality of sub-patterns; and,
recording light intensity from within the second plurality of detection fields repeatedly over a course of the relative motion in such a way that a given portion of the surface of the sample is consecutively covered by each of the second plurality of detection fields over the course of the relative motion.

35. An image acquisition method for acquiring at least one image of a surface of a sample, comprising the steps:
projecting a periodic fringe pattern onto an area of the surface of the sample;
generating, in a pre-defined reference plane, a relative motion between the pattern and the sample; and,
defining at least one detection fields within the area of the surface of the sample the pattern is projected on, with geometric projections of the detection fields onto the reference plane arranged in such a way that there is a line in the reference plane parallel to a direction of the relative motion which intersects the geometric projection of each of the at least one detection fields, wherein an angle between the direction of relative motion and an orientation of fringes of the fringe pattern, as geometrically projected onto the reference plane, is larger than 0 degrees and smaller than 90 degrees, and is such that across the at least one detection fields a single fringe completes a full period.

* * * * *